US010865899B2

(12) United States Patent
Wiedemeier et al.

(10) Patent No.: US 10,865,899 B2
(45) Date of Patent: Dec. 15, 2020

(54) SYSTEM AND METHOD FOR PROTECTING A PRESSURE VESSEL FROM EXCESSIVE DIFFERENTIAL PRESSURE

(71) Applicant: The United States of America as represented by the Secretary of the Navy, San Diego, CA (US)

(72) Inventors: Brandon J. Wiedemeier, San Diego, CA (US); Jesse T. Caldwell, Alpine, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 82 days.

(21) Appl. No.: 16/143,616

(22) Filed: Sep. 27, 2018

(65) Prior Publication Data

US 2020/0103040 A1   Apr. 2, 2020

(51) Int. Cl.
*F16K 17/00*   (2006.01)
*F16K 17/04*   (2006.01)

(52) U.S. Cl.
CPC .......... *F16K 17/003* (2013.01); *F16K 17/048* (2013.01); *F17C 2205/0332* (2013.01); *Y10T 137/2036* (2015.04)

(58) Field of Classification Search
CPC ......... Y10T 137/2036; Y10T 137/2012; F16K 17/003; F16K 17/048; F17C 2205/0332; B63B 2021/007; B63C 11/52
USPC ........................................................ 405/193
See application file for complete search history.

(56) References Cited

U.S. PATENT DOCUMENTS

| | | | | |
|---|---|---|---|---|
| 3,112,724 A * | 12/1963 | Rosen | ...................... | B63G 8/22 114/331 |
| 3,260,062 A * | 7/1966 | Mitchell | .................. | F17C 3/005 62/48.2 |
| 3,447,552 A * | 6/1969 | Grosson | ................... | B63C 11/52 137/81.2 |
| 3,572,032 A * | 3/1971 | Terry | ...................... | B63C 11/52 60/398 |
| 3,717,078 A * | 2/1973 | Ogura | ..................... | B63C 11/52 396/26 |
| 3,759,605 A * | 9/1973 | Johnson | ................. | G02B 23/22 359/667 |

(Continued)

*Primary Examiner* — David Colon-Morales
(74) *Attorney, Agent, or Firm* — Naval Information Warfare Center, Pacific; Kyle Eppele; James McGee

(57) ABSTRACT

A system and method for protecting a lightweight pressure vessel capable of airborne and underwater use. The system includes an enclosure and a gas container that is capable of holding pressurized or liquefied gas in sufficient quantity to increase internal pressure of the pressure vessel, so that the internal pressure of the pressure vessel equals an external pressure of the pressure vessel. The system also includes a pressure relief device coupled to the enclosure. The pressure relief device is configured to release the pressurized or liquefied gas from the pressure vessel when the internal pressure exceeds the external pressure by a predetermined amount. The system also includes a gas supply mechanism coupled to the gas container, the gas supply mechanism being configured to allow gas from the gas container into order to increase the internal pressure of the pressure vessel until the internal pressure equals the external pressure.

19 Claims, 2 Drawing Sheets

(56) References Cited

U.S. PATENT DOCUMENTS

| | | | | |
|---|---|---|---|---|
| 4,187,796 | A | * | 2/1980 | Ess ............... B63G 8/14 |
| | | | | 114/312 |
| 4,256,699 | A | * | 3/1981 | Kraft .............. B01J 7/00 |
| | | | | 422/166 |
| 4,674,429 | A | * | 6/1987 | Buckle ............ B63C 7/10 |
| | | | | 114/331 |
| 4,771,320 | A | * | 9/1988 | Gell ............... G03B 17/08 |
| | | | | 114/312 |
| 4,853,722 | A | * | 8/1989 | Gell, Jr. .......... G03B 17/08 |
| | | | | 396/26 |
| 4,903,628 | A | * | 2/1990 | Lansford ......... B63C 11/52 |
| | | | | 114/312 |
| 4,947,783 | A | * | 8/1990 | Gell, Jr. .......... G03B 17/08 |
| | | | | 114/312 |
| 4,951,698 | A | * | 8/1990 | Grosso ............ B63C 11/52 |
| | | | | 137/14 |
| 5,067,855 | A | * | 11/1991 | Kamitani ......... B63C 11/02 |
| | | | | 405/186 |
| 5,144,905 | A | * | 9/1992 | Tanaka ............ B63G 8/001 |
| | | | | 114/312 |
| 5,201,611 | A | * | 4/1993 | Komaki ........... B63B 3/13 |
| | | | | 405/185 |
| 5,285,998 | A | | 2/1994 | Zink |
| 6,273,019 | B1 | * | 8/2001 | Ciamillo, II .... B63C 11/46 |
| | | | | 114/312 |
| 6,325,088 | B1 | | 12/2001 | Scanlin |
| 7,424,917 | B2 | * | 9/2008 | Martin ............. B63C 11/52 |
| | | | | 166/335 |
| 8,069,874 | B2 | * | 12/2011 | Overstreet ...... F16L 41/06 |
| | | | | 137/318 |
| 8,464,745 | B1 | * | 6/2013 | Ringer ............. B63G 8/22 |
| | | | | 114/312 |
| 8,714,176 | B2 | * | 5/2014 | Kerr ................ B63C 11/2245 |
| | | | | 137/102 |
| 8,733,382 | B2 | | 5/2014 | Suess |
| 8,956,574 | B2 | | 2/2015 | Layman |
| 9,084,358 | B2 | * | 7/2015 | Dawes ............ B63C 11/00 |
| 9,132,404 | B2 | | 9/2015 | Layman |
| 9,273,543 | B2 | | 3/2016 | Baca |
| 9,570,224 | B2 | * | 2/2017 | Kristensen ...... E21B 33/035 |
| 9,857,807 | B2 | | 1/2018 | Baca |
| 10,107,078 | B2 | * | 10/2018 | Taylor ............ B63C 11/52 |
| 2004/0151600 | A1 | | 8/2004 | Bock |
| 2019/0337601 | A1 | * | 11/2019 | Carvalhar Marins .... H02G 1/10 |
| 2019/0351985 | A1 | * | 11/2019 | Adamson ........ G06F 3/0346 |

\* cited by examiner

SYSTEM AND METHOD FOR PROTECTING A PRESSURE VESSEL FROM EXCESSIVE DIFFERENTIAL PRESSURE

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 3600, San Diego, Calif., 92152; telephone (619)553-3001; email: ssc_pac_t2@navy.mil.

BACKGROUND OF THE INVENTION

Field of Invention

This disclosure relates generally to pressure vessels and, more particularly, to protection of a pressure vessel from excessive differential pressure.

Description of Related Art

It may be desirable for a pressure vessel to be capable of both airborne and underwater use, in addition to surface use. However, given the constraints of depth tolerance, antifouling, corrosion resistant, lightweight, and low cost, the options for an underwater pressure vessel that is aerospace-capable becomes limited due to excessive differential pressure between the interior and exterior when the pressure vessel is at an underwater depth. High strength metals have been typically used for underwater pressure vessels, such as boat hulls, buoys, and underwater sensor housings.

A considerable issue for external pressure survivability is buckling resistance. Steel has the advantage of stiffness and will increase buckling resistance, given the same thickness, over titanium, aluminum and other similar metals, but has the direct disadvantage of being one of the heavier choices. Unfortunately, though metals such as titanium can be alloyed to have a high strength to weight ratio, the stiffness to weight ratio is nearly identical to the lower cost metals mentioned. Given buckling will be the mode of failure for sufficiently strong materials, a higher strength to weight ratio may not improve performance enough to justify the higher cost of manufacturing.

When corrosion is added into the equation, the choice of a sufficiently strong, lightweight solution may come down to aluminum, titanium or stainless steel for most applications. Once cost is added, and buckling is still the failure mode, aluminum has been the metal of choice in many applications over more expensive options. High strength aluminum also has the cost advantage, where material and machining costs are sometimes a factor of the choice between the three; aluminum is better than metals such as stainless steel and titanium. Aluminum also has certain geometric advantages, where buckling rings, cross pattern stiffeners, and other complex shapes can be added to the inside and outside of a vessel more cheaply, lowering weight and improving buckling performance. There is, however, a limit to the geometric advantage, including local weakness to denting, and reduced toughness. When minimizing the weight of such vessels with buckling in mind, survivability due to other considerations becomes an issue.

Composites have the distinct disadvantage of cost to manufacture; however, it can be argued because they produce a higher stiffness to weight ratio. Composites may also be better than some metals. With a sufficient strength to weight and higher stiffness to weight than most metals, it becomes a better choice for buckling considerations with few other disadvantages. Composites typically don't corrode in the sea environment. They also compete with alloys in strength to toughness, and can therefore do well to survive other failure modes. However, there are known difficulties with sealing, water absorption, and delamination, leading to unpredictability. They also typically require more resources to produce, requiring molds, and therefore take more time to produce and are less cost effective for low level production.

There is a need for a pressure vessel that can minimize weight, and cost, while still providing for depth tolerance and aerospace capability.

SUMMARY OF THE INVENTION

Aspects of the present disclosure provide a system and method for protecting a pressure vessel from excessive differential pressure. In accordance with one embodiment of the present disclosure, a system is provided. The system comprises a gas container configured to be coupled to a pressure vessel, the gas container being further capable of supplying gas or liquid to the pressure vessel in order to increase internal pressure of the pressure vessel so that the internal pressure of the pressure vessel equals an external pressure of the pressure vessel.

The system also comprises a pressure relief device capable of being coupled to the pressure vessel, the pressure relief device being configured to release the gas or liquid from the pressure vessel when the internal pressure exceeds the external pressure.

Finally, the system comprises a gas or liquid supply mechanism coupled to the gas container, the gas or liquid supply mechanism being configured to allow gas or liquid from the gas container into the pressure vessel in order to increase the internal pressure of the pressure vessel until the internal pressure of the pressure vessel equals the external pressure of the pressure vessel.

BRIEF DESCRIPTION OF THE DRAWINGS

The accompanying drawings, which are incorporated in and form a part of the specification, illustrate example embodiments and, together with the description, serve to explain the principles of the invention. In the drawings.

DETAILED DESCRIPTION OF THE EMBODIMENTS

Aspects of the present disclosure provide a system and method for protecting a pressure vessel from excessive differential pressure. The system and method are capable of airborne use, and are also capable of surviving underwater subsea depths. The system and method use gas to compensate for external pressure during descent. When the pressure vessel ascends back to the water's surface, the system and method incorporate the release of gas in order to avoid overpressure.

The present system and method incorporate three key features that allow a pressure vessel to survive depth and still be light enough to be aerospace capable. One is the internal pressure generator, either by compressed gas, liquefied gas, or other means, to increase internal pressure to match ambient external pressure. Two, the relief valve or other pressure relief device is set to release internal pressure such that when the system ascends through the water column, it will not be subject to overpressure. Three, the present system and method may be used with a larger number of pressure vessel shapes. In the prior art, the shape of the pressure vessel is typically important to maintain lightweight operation and prevent deformation. However, with pressure compensation, the shape becomes less critical, and can in fact be of any shape including the hull and wings of an airplane, a rocket, or even a lighter-than-air (LTA) vehicle.

Figure 1A:
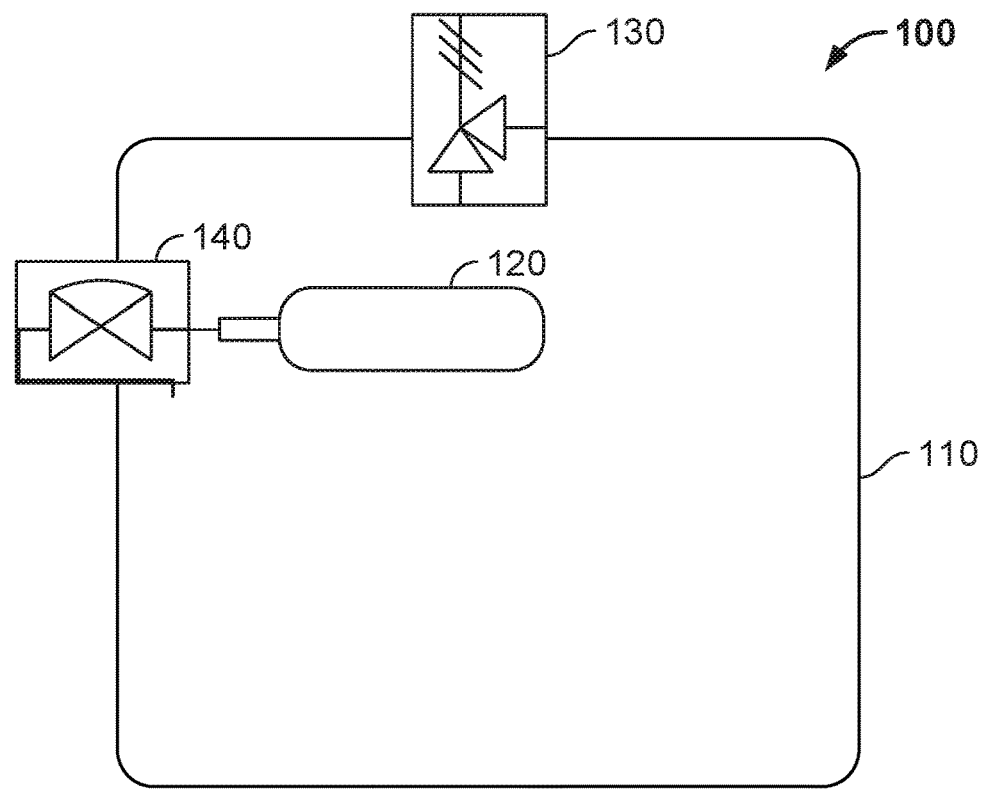
FIG. 1A and FIG. 1B illustrate a system for protecting a pressure vessel from excessive differential pressure in accordance with aspects of the present disclosure.
Figure 1B:
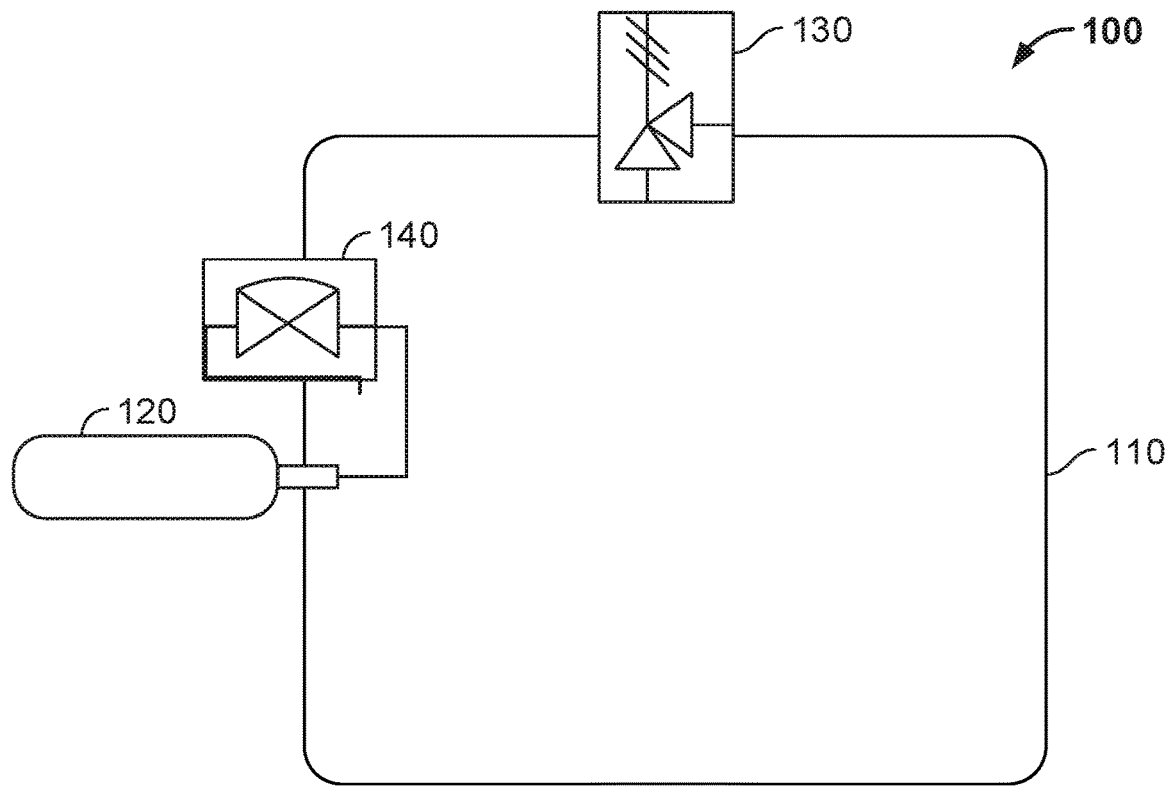

Referring now to FIG. 1A and FIG. 1B, illustrated is a system for protecting a pressure vessel from excessive differential pressure in accordance with one embodiment of the present disclosure. The system 100 includes a pressure vessel 110. The pressure vessel 110 may be designed to hold gases or liquids at a pressure substantially different from the ambient pressure. The pressure vessel 110 may be thin-walled, as thin as is necessary to not be damaged by handling. The pressure vessel 110 could be as thin as a soda can, barely able to stand up under its own weight, akin to an underwater super-pressure balloon. In fact, it may be desirable for the present pressure vessel 110 to be significantly thinner than a typical vessel must be at the design depth.

So that the system 100 may survive underwater depths, the pressure vessel 110 should be substantially watertight so that water does not enter and damage the internal contents of the pressure vessel 110. The pressure vessel 110 may be made from metal, composite, or other material necessary to complete the mission.

Various materials may be used for the pressure vessel 110. However, regardless of material chosen, the problem of weight comes down to minimum thickness to survive depth. The present system 100 thus levels the field by providing an alternative means of counter-acting the depth pressure by increasing internal pressure with depth. In this way, the thickness can be reduced further and stiffness becomes less of a determining factor. Cost, among other competing variables, can then control material choice.

With an active method for controlling internal pressure, either mechanical or electrically controlled, the weight of the pressure vessel 110 can be minimized. Active internal pressure control, combined with lightweight, tough, corrosion-resistant material, and lowcost valves, gives the present system and method sufficient lightness so that the associated lightweight pressure vessel may become airborne.

The system 100 also includes a gas container 120 configured to be coupled to the pressure vessel. A hose or other supply may connect or join the pressure vessel 110 to the gas container 120. In the present example, the gas container 120 is a gas cylinder being capable of holding a gas or liquid in sufficient quantity to increase internal pressure of the pressure vessel, so that the internal pressure of the pressure vessel substantially equals an external pressure of the pressure vessel 110. For purposes of the present disclosure, a sufficient quantity means, for example, enough volume to offset pressure by the ideal gas relation, or if using a liquid, by replacing the volume lost by the compression of the contained liquid. In other words, the gas quantity should be sufficient to raise internal pressure to meet ambient pressure of the system 100, or liquid volume to maintain original volume. In any case, the geometric volume of the system shall remain close to that of the size at the surface, thus preventing geometric changes that may lead to buckling. In lieu of a gas cylinder, the gas container 120 may be a sphere or other shape as long as internal pressure of the gas container 120 may be controlled. The gas container 120 may contain a gas or liquid, including a pressurized gas, a liquefied gas, oil, water or other liquid or gas in high enough quantity to increase internal pressure to equalize external pressure. This can be as simple as high pressure air (HPA), compressed nitrogen, or carbon dioxide ($CO_2$) cartridges available for recreational use. The system would include these pressure generating sources and would include the release valve on the cylinder (if necessary) that will interface with the diaphragm valve. It may be desirable for the gas or liquid in the gas container to operate with internal mechanical elements and valves. Where a compressible substance such as water or oil is used, it may be desirable to have a separate reservoir with a piston to create pressure, in other words push volume, or some type of expanding chamber or bladder within the system 100.

The system 100 also includes a pressure relief device 130 coupled to the thin walled pressure vessel 110. The pressure relief device 130 may be a relief valve. The pressure relief device 130 is capable of being coupled to the pressure vessel 110. The pressure relief device 130 is also configured to release the pressurized or liquefied gas from the pressure vessel 110 when the internal pressure substantially exceeds the external pressure. The system 100 may be designed such that the substantial pressure differential must be a predetermined amount. This differential would be less than would be necessary to either burst the vessel due to internal pressure, or buckle the vessel due to external pressure. Given a safety factor at a certain ambient pressure of, for example, two, the pressure would be allowed to exceed the ambient by two (2) or be less than the ambient by a factor of 0.5. The pressure relief device 130 will let gas out of the pressure vessel 110 when the internal pressure (Pi) exceeds the external pressure by some fixed amount. The maximum differential would be a safety factor less than the pressure vessel is capable of withstanding without deformation or rupture.

The system 100 further includes a gas supply mechanism 140 such as a diaphragm valve coupled to the gas container 120. The gas supply mechanism 140 is configured to allow gas from the gas container 120 in order to increase the internal pressure of the system 100 until the internal pressure equals the external pressure. This gas supply mechanism 140 may move a rod or another tank pneumatic valve to allow gas from the high pressure gas container 120 to increase the internal pressure of the system 100 until the pressure inside the watertight pressure vessel 110 equalizes the pressure outside. The pressure vessel is capable of surface, aerial and subsea deployment.

As the system 100 descends in the water column to a greater underwater depth, the gas supply mechanism 140 triggers the gas container 120 to release gas into the watertight pressure vessel 110, thus increasing internal pressure. When the system 100 ascends in the water column to a lesser underwater depth, the pressure relief device 130 automatically releases pressure in excess of ambient pressure so as not to overpressure the enclosure 110. The system 100 regulates the internal pressure to match the external pressure.

If the system 100 is used for airborne operation, it can release additional gas and operate in the same manner. Alternatively, if the system is not expected to become submerged again, the gas container 120, which may be a high pressure container, can be mounted externally as shown in FIG. 1B and be made to drop off, thus saving more weight.

If the system 100 is used in conjunction with lightweight unmanned underwater vehicles (UUVs) or autonomous underwater vehicles (AUVs) as the pressure vessel 110, these vehicles may be launched sub-surface. If the pressure vessel 110 is a sensor, it can be made light enough to be hand portable and deployable. This system 100 can protect the pressure vessel 110 from rupture or crush to any depth needed for less cost and complexity than typical subsea pressure vessels.

Figure 2:
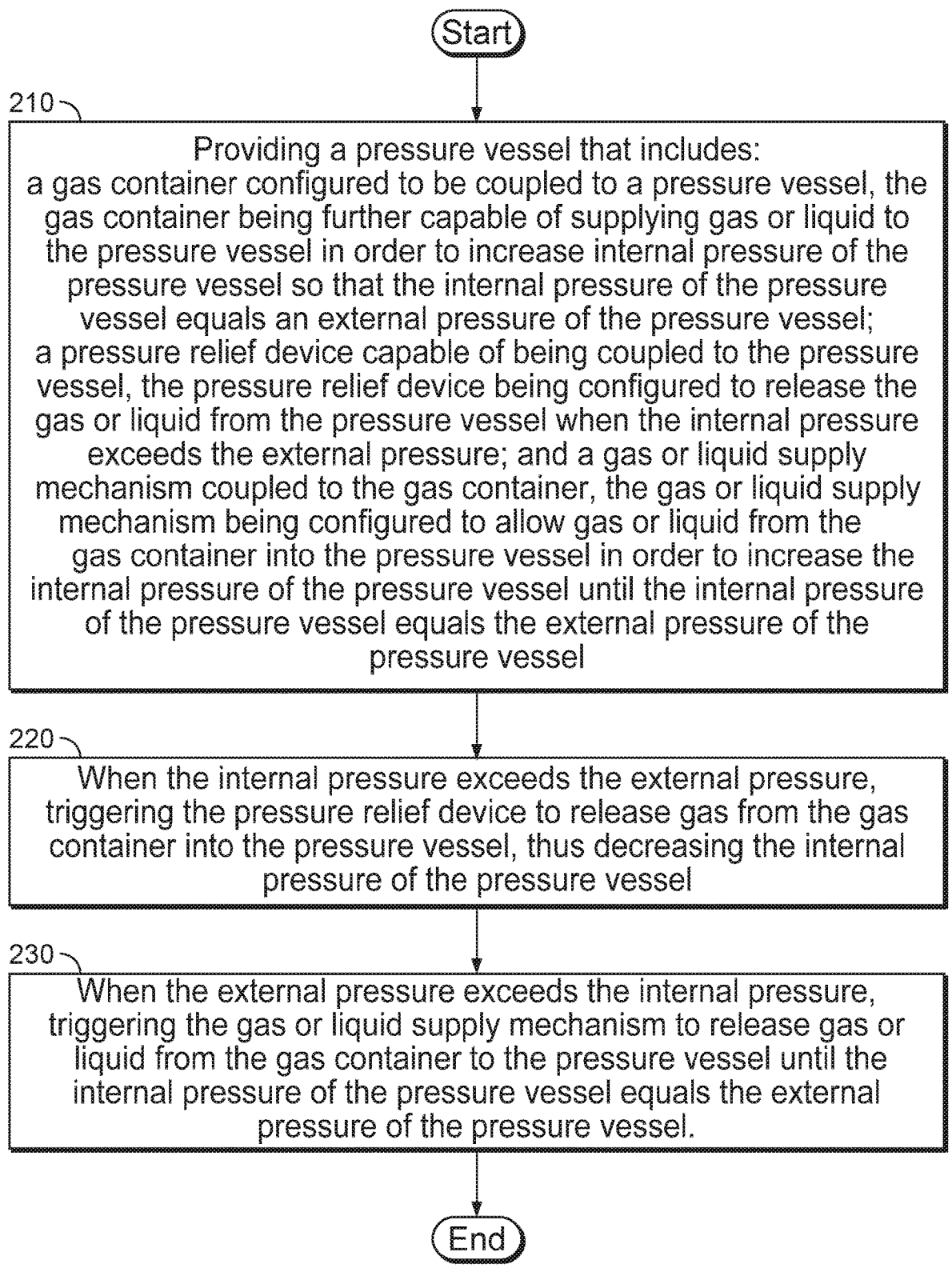
FIG. 2 illustrates a flow chart for a method for protecting a pressure vessel from excessive differential pressure in accordance with aspects of the present disclosure.

Referring now to FIG. 2, illustrated is a method for protecting a pressure vessel from excess differential pressure in accordance with one embodiment of the present disclosure. At step 210, the method includes providing a pressure vessel protection system that includes a gas container configured to be coupled to a pressure vessel, the gas container being further capable of supplying gas or liquid to the pressure vessel in order to increase internal pressure of the pressure vessel so that the internal pressure of the pressure vessel substantially equals an external pressure of the pressure vessel; a pressure relief device capable of being coupled to the pressure vessel, the pressure relief device being configured to release the gas or liquid from the pressure vessel when the internal pressure substantially exceeds the external pressure; and a gas or liquid supply mechanism coupled to the gas container, the gas or liquid supply mechanism being configured to allow gas or liquid from the gas container into the pressure vessel in order to increase the internal pressure of the pressure vessel until the internal pressure of the pressure vessel substantially equals the external pressure of the pressure vessel.

At step 220, when the internal pressure exceeds the external pressure, the system triggers the pressure relief device to release gas from the gas container into the pressure vessel, thus decreasing the internal pressure of the pressure vessel.

At step 230, when the external pressure exceeds the internal pressure, the system triggers the gas or liquid supply mechanism to release gas or liquid from the gas container to the pressure vessel until the internal pressure of the pressure vessel substantially equals the external pressure of the pressure vessel.

For the constraints described above, the system and method can allow launch of aerospace-capable craft from subsea. The advantage of a subsea launch is three-fold. One, the system and method permit covert drop and launch. Given a greater depth than is typically possible, the system and method permit hiding and prevent detection based on depth. Two, the system and method permit storage for long periods, allowing favorable timing for deployment. For example, covert seeding can be done months or years in advance and triggered subsea or be timed to launch later. Three, due to the lightweight nature of the system and method, less fuel, power and a smaller size can be realized.

The foregoing description of various embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A system for protecting a pressure vessel that is capable of surface, aerial and subsea deployment from excessive differential pressure between an internal pressure and an external pressure, the system comprising:
    a gas container configured to be coupled to the pressure vessel, which is an unmanned aerospace vehicle, the gas container capable of supplying a gas or liquid to the pressure vessel to increase the internal pressure of the pressure vessel, wherein the gas container is further configured to uncouple from the pressure vessel and drop away when no longer needed for supplying the gas or liquid to the pressure vessel;
    a relief valve coupled to the pressure vessel, the relief valve configured to release the gas or liquid from the pressure vessel when the internal pressure substantially exceeds the external pressure; and
    a supply valve coupled to the gas container, the supply valve configured to allow the gas or liquid from the gas container into the pressure vessel to increase the internal pressure of the pressure vessel until the internal pressure of the pressure vessel substantially equals the external pressure of the pressure vessel.

2. The system of claim 1, wherein the gas or liquid is pressurized gas.

3. The system of claim 2, wherein the pressurized gas is selected from the group consisting of air, nitrogen, and carbon dioxide.

4. The system of claim 1, wherein the gas or liquid is liquefied gas.

5. The system of claim 1, wherein the gas container is a gas cylinder.

6. The system of claim 1, wherein the gas container is a gas sphere.

7. The system of claim 1, wherein the unmanned aerospace vehicle is adapted to be deployed submerged within a body of water, ascend to a surface of the body of water, and become airborne with the air container uncoupling and dropping away to reduce weight upon the unmanned aerospace vehicle becoming airborne.

8. A method for protecting a pressure vessel of an aerospace vehicle from excessive differential pressure between an internal pressure and an external pressure, comprising:
    providing a pressure vessel protection system that includes:
        a gas container configured to be coupled to the pressure vessel, the gas container capable of supplying a gas or liquid to the pressure vessel to increase the internal pressure of the pressure vessel;
        a relief valve coupled to the pressure vessel, the relief valve configured to release the gas or liquid from the pressure vessel when the internal pressure substantially exceeds the external pressure; and
        a supply valve coupled to the gas container, the supply valve configured to allow the gas or liquid from the gas container into the pressure vessel to increase the internal pressure of the pressure vessel until the internal pressure of the pressure vessel substantially equals the external pressure of the pressure vessel;
    when the internal pressure substantially exceeds the external pressure while the aerospace vehicle ascends from underwater until becoming airborne, triggering the relief valve to release the gas or liquid from the pressure vessel, thus decreasing the internal pressure of the pressure vessel; and
    when the external pressure substantially exceeds the internal pressure while the aerospace vehicle descends during deployment underwater, triggering the supply valve to release the gas or liquid from the gas container to the pressure vessel until the internal pressure of the pressure vessel substantially equals the external pressure of the pressure vessel.

9. The method of claim 8, wherein the gas or liquid is pressurized gas.

10. The method of claim 9, wherein the pressurized gas is selected from the group consisting of air, nitrogen, and carbon dioxide.

11. The method of claim 8, wherein the gas or liquid is liquefied gas.

12. The method of claim 8, wherein the gas container is a gas cylinder.

13. The method of claim 8, wherein the gas container is a gas sphere.

14. The method of claim 8, wherein the pressure vessel is a hull of the aerospace vehicle that is an unmanned aerospace vehicle.

15. A system, comprising:
   a pressure vessel that is a hull of an aerospace vehicle;
   a gas cylinder configured to be coupled to the pressure vessel, the gas cylinder capable of supplying a gas or liquid to the pressure vessel to increase an internal pressure of the pressure vessel;
   a relief valve coupled to the pressure vessel, the relief valve configured to release the gas or liquid from the pressure vessel when the internal pressure exceeds an external pressure of the pressure vessel; and
   a diaphragm valve coupled to the gas cylinder, the diaphragm valve configured to allow the gas or liquid from the gas cylinder into the pressure vessel to increase the internal pressure of the pressure vessel until the internal pressure of the pressure vessel equals the external pressure of the pressure vessel.

16. The system of claim 15, wherein the pressure vessel is the hull an unmanned aerospace vehicle.

17. The system of claim 15, wherein the gas or liquid is pressurized gas.

18. The system of claim 17, wherein the pressurized gas is selected from the group consisting of air, nitrogen, and carbon dioxide.

19. The system of claim 15, wherein the gas or liquid is liquefied gas.

* * * * *